United States Patent [19]

Dijkers et al.

[11] Patent Number: 4,746,918

[45] Date of Patent: May 24, 1988

[54] SPLIT BUS SYSTEM INTERFACE

[75] Inventors: Gerardus J. P. Dijkers, Hilversum; Adrianus H. Dieleman, Eindhoven, both of Netherlands

[73] Assignee: U.S. Philips Corporation, New York, N.Y.

[21] Appl. No.: 940,474

[22] Filed: Dec. 10, 1986

[30] Foreign Application Priority Data

Dec. 18, 1985 [NL] Netherlands ............................ 8503476

[51] Int. Cl.[4] .................................................. H04Q 9/00
[52] U.S. Cl. ................................. 340/825.060; 370/94; 370/84; 370/85; 340/825.520
[58] Field of Search ...................... 340/825.06, 825.05, 340/825.52; 370/60, 94, 86, 70, 26, 83, 84, 85

[56] References Cited

U.S. PATENT DOCUMENTS

| | | | |
|---|---|---|---|
| 4,324,900 | 4/1982 | Ali | 370/70 |
| 4,603,416 | 7/1986 | Servel et al. | 370/94 |
| 4,677,616 | 6/1987 | Franklin | 370/94 |
| 4,697,262 | 9/1987 | Segal | 370/84 |

*Primary Examiner*—Donald J. Yusko
*Attorney, Agent, or Firm*—Thomas A. Briody; Algy Tamoshunas; William J. Streeter

[57] ABSTRACT

A bus system, comprising a bus formed by a plurality of parallel lines for data transmission handshake signals and general management signals, the bus being coupled to a central processor and to a plurality of devices for transmitting and/or receiving data signals and checking signals. The system is in the data mode when the central processor is inoperative and the system is in the command mode when the central processor is operative. The bus is split into a left-hand bus half and a right-hand bus half, the series arrangement of a first interface circuit, a connecting path and a second interface circuit being arranged between the two bus halves, at least one of the interface circuits including a parallel-series-converter whose input is coupled to the associated bus half and whose output is coupled to the connecting path, the other interface including a series-parallel converter whose input is coupled to the connecting path and whose output is coupled to the associated bus half through an elastic data store, when the system is in the data mode, a device which wants to transmit data from one bus half to the other bus half will exchange the handshake signals with the interface circuit to which this device is connected through one bus half. A device connected to the other bus half through the connecting path will exchange the handshake signals with the interface circuit to which this device is connected through the other bus half.

4 Claims, 1 Drawing Sheet

SPLIT BUS SYSTEM INTERFACE

The invention relates to a bus system, comprising a bus formed by a plurality of parallel lines for data transmission handshake signals and general management signals. The bus is coupled to a central processor and to a plurality of devices for transmitting and/or receiving data signals and check signals. The system is in the data mode when the central processor is inoperative and the system is in the command mode when the central processor is operative. A complete bus system comprises a central processor, a plurality of devices suitable for transmitting data and a plurality of devices suitable for receiving data. The data transmitting devices are denoted as the speaker and the data receiving devices are denoted as the listener. When the central processor is in the operative state (command mode) all the devices connected to the bus will listen to the command signals produced by the processor. When the processor is in the inoperative state (data mode), only one speaker can transmit its data to one or more listeners. The speaker and listener functions of the devices are activated by command signals originating from the processor. Normally 15 devices can be connected to the bus of the system. The bus is formed by a total of 16 parallel lines, which are used for data transmission, handshake signals and general interface management signals. Eight lines are available for the data transmission and 3 lines for the handshake signals. The remaining 5 lines are used for the general interface management signals. A bus system of the above-defined type is described in, for example, "Byte", Apr. 1982, pages 186–208 and in the book "Digital Instrument Course", Part 4, N. V. Philips' Gloeilampenfabrieken, Test and Measuring Department, Eindhoven, The Netherlands.

The protocol of the above-described bus system has been chosen such that the maximum overall length of the link between a data transmitter and a data receiver is 20 meters, in view of delays occurring in the system. The maximum permissible throughput rate is in that case 1 Mbit/sec. Throughput rate is here understood to be the rate at which a speaker or the central processor transmits its data. Let it be assumed that parallel data transport is effected between a data transmitter and a data receiver and that each data byte (8 bits) is accompanied by a single handshake signal. After the receiver has received this data byte, the receiver will report this to the data transmitter. Let it further be assumed that the link between the data transmitter and the data receiver is 5 kms and that the path is constituted by a transmission cable. The rate of propagation in such a cable is approximately equal to 200,000 km/s. This implies, that said data byte requires 25 microseconds to arrive at the data receiver from the data transmitter. The message from the data receiver to the data transmitter, confirming the correct reception of the data byte, also takes 25 microseconds. In a normal handshake procedure this means that the total time required for the transmission of one data byte is 75 microseconds. This implies the said throughput rate can never be more than 15 kbit/sec.

SUMMARY OF THE INVENTION

The invention has for its object to provide means to extend the link between a data transmitter and a data receiver in a bus system to a link exceeding the said 20 meters, while maintaining the maximum permissible throughput rate of 1 mbit/s.

The invention is characterized in that the bus is split into a left-hand bus half and a right-hand bus half. The series arrangement of a first interface circuit, a connection path and a second interface circuit is provided between the two bus halves. At least one of the interface circuits includes a parallel-series converter whose input is coupled to the associated bus half and whose output is coupled to the connection path, the other interface circuit including a series-parallel converter whose input is coupled to the connection path and whose output is coupled to the associated bus half via an elastic store. In this situation, when the system is in the data mode, a device which wants to transmit data from one bus half to the other bus half will exchange the handshake signals with the interface circuit to which this device is connected via one bus half, and a device connected to the other bus half via the connection path will exchange the handshake signals with the interface circuit to which this device is connected via the other bus half.

The invention will now be described in greater detail, by way of example, with reference to the accompanying drawings.

DESCRIPTION OF THE PREFERRED EMBODIMENT

Figure 1:
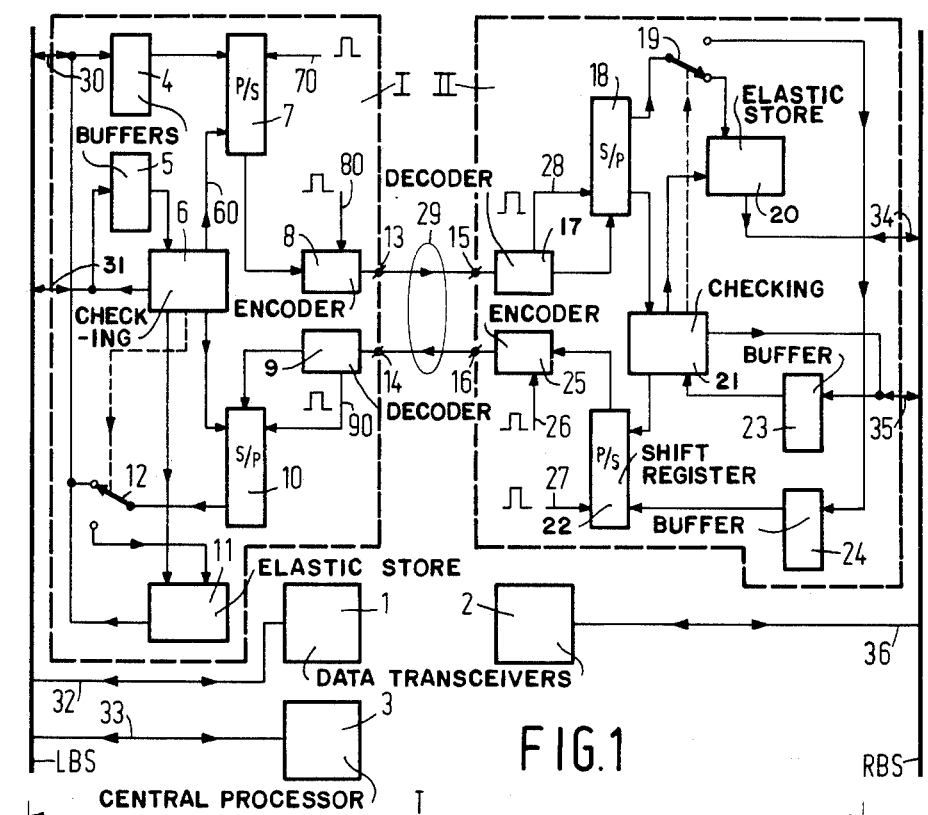
FIG. 1 shows an embodiment of a bus system according to the invention.

In the embodiment of FIG. 1, BS denotes the bus of the bus system. As has already been mentioned in the foregoing, the bus is formed by a total of 16 parallel lines. Eight lines are available for data transmission. For the general interface management signals 5 lines are available and 3 lines for the handshake signals. It should be noted that when each signal or operation via an interface is followed by a signal or an operation in the other direction, a situation is obtained in which there is handshaking. See, for example, said aforementioned book "Digital Instrument Course", pages 13 and 14. The bus system further includes the data transceivers 1 and 2, the central processor 3 and the two interface circuits I and II. The data transceiver 1, the central processor 3 and the interface circuit I are connected to the left-hand bus LBS. The data transceiver 2 and the interface II are connected to the right-hand bus RBS.

The data transceiver 2 and the interface II are connected to the right-hand bus RHS. The interface circuit I comprises the buffer stages 4 and 5, the parallel-series converter 7, the control circuit 6, the series-parallel-converter 10, the encoding unit 8, the decoding unit 9, the elastic store 11 and the switch 12. The data input of the parallel-series converter 7 is connected to the bus LBS via the buffer stage 4. The output of the parallel series converter is connected via the encoding arrangement to the output 13 of the interface circuit I. The bus LBS is also connected via the buffer stage 5 to the input of the controlling circuit 6. A first output of the control circuit is connected to an input of the parallel-series-converter, a second output is connected to an input of the series-parallel-converter 10, a third output is connected to the switch 12, a fourth output is connected to an input of the elastic store 11 and a fifth output is connected to the bus LBS. The data output of the series-parallel-converter 10 is connected to the master contact of the switch 12 a first switching contact of which is connected to the bus LBS and a second switching contact is connected to an input of the elastic store 11. The output of the elastic store is connected to the first switching contact of the switch 12, the input 14 of the interface circuit I is connected to the signal input of the series-parallel-converter 10 via the decoding arrangement 9.

The interface circuit II comprises the buffer stages 23 and 24, the parallel-series converter 22, the second circuit 21, the series-parallel converter 18, the encoding unit 25, the decoding unit 17, the elastic store 20 and the switch 19. The structure of the interface circuit II is identical to the structure of the interface circuit I and is coupled to the right-hand bus RBS.

Each of the two interfaces I and II includes a transmitter section and a receiver section to enable upstream and downstream conveyance of information via the connecting path 29. The transmitting section of the interface I comprises the buffer stages 4 and 5, shift register 7, encoding unit 8 and the checking circuit 6. The receiving section of the interface I comprises the decoding unit 9, shift register 10, elastic store 11, switch 12 and checking circuit 6. The transmitting section of interface II comprises buffer stage 23 and 24, the shift register 22, the encoding unit 25 and the checking circuit 21. The receiving section of the interface II comprises the decoding unit 17, shift register 18, elastic store 20, switch 19 and the checking circuit 21. Said information relates to data bytes and command bytes. In the case of data conveyance from left to right, the bytes are applied to the shift register 7 for converting the parallel information into serial information. This last type of information is required since only serial transport is possible via the connecting path 29 between the interfaces I and II. It is of course a must for the information to be stable at the instant in which it is entered into the shift register 7. The stability is realized with the aid of the buffer stage 4, which samples the applied information at the appropriate instant. To a certain extent this buffer stage provides a transition from an asynchronously operating bus to the synchronous information transmission via the connecting path 29. As has already been mentioned in the foregoing, the bus also operates with a plurality of "handshake" signals and general interface management signals. The majority of the signals are processed in a way different from the way described above for data and command bytes. This is realized with the aid of the checking circuit 6.

When the system is in the command mode, the handshake signals are transmitted to the interface II via the connecting path 29. This is, consequently, a normal procedure. However, when the system is in the data mode, the handshake signals are not transmitted via the connecting path 29 to the interface II but a what is commonly referred to as a local handshake procedure is effected. In that case a speaker will start these procedures with an interface and possible listeners, which are connected to the speaker via a bus half, after a transition from the command mode to the data mode of the system. The listeners connected to the other bus half start their handshake procedure with the interface to which they are connected via this bus half. In the case of data conveyance from the left-hand bus to the right-hand bus the speaker will transmit half of the data to the interface I. The interface I will convey this data to the interface II, which conveys the data to the right-hand half. As the speaker and the listener connected to the interface II do no longer cooperate in a direct way, the data received by the interface II cannot be further conveyed directly after reception to the listener connected to the right-hand bus half and the speaker has to know whether the listeners are ready to receive a data byte. For that reason an elastic store 20, which can be written and read simultaneously, is used in the interface II. In addition, this store ensures that each data byte is stored in the sequence of arrival ("first-in first-out"). When for some reason a listener cannot receive data for a short period of time, or when the listener cannot receive the data bytes with the same speed as these bytes were transmitted by the speaker, the data bits not yet received by the listener are stored in the sequence of their arrival in the elastic store 20. Storing the data bytes in the appropriate sequence automatically implies that the data bytes can be read in the proper sequence. Since the store 20 has a limited storage capacity, the interface II will convey a signal to the interface I when said storage capacity threatens to be exceeded. After reception of this signal, the interface I will block the conveyance of data to the interface II with the aid of a handshake procedure. Additionally, the store 20 must have additional storage capacity, as when the path between the output 13 of the interface I and the input 15 of the interface II has a length of 5 km it is possible that a further 25 data bytes are on their way to the interface II. Moreover, it takes 25 microseconds for the signal "store full" to travel from the output 16 of the interface II to the input 14 of the interface I. This means that after the store 20 in the interface II has transmitted the signal "store full" it must be capable of storing at least an additional 50 data bytes. For a still greater length of the connecting path 29, this additional storage capacity must be chosen proportionally greater. For example with a length of 10 kms this additional storage capacity will have to be at least 100 data bytes.

Summarizing the above, it can be said that using the local handshake procedures for the data bytes and the use of elastic stores in the interfaces I and II creates the possibility to choose the connecting path between the left-hand bus LBS and the right-hand bus RBS many times longer than 20 meters, for example 5 or 10 kilometers, whilst maintaining the maximum data throughput rate of 1 Mbyte/sec.

Figure 2A:
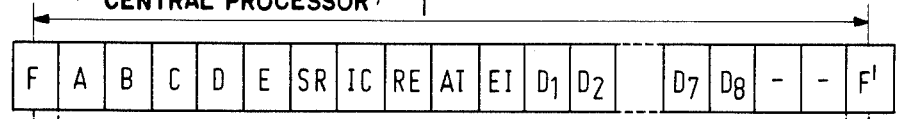
FIGS. 2a and 2b show the frame structure such as it is used in the bus system according to the invention.

FIG. 2a shows the structure of a frame such as it is used in the bus system according to the invention. The portions F and F' are used for frame synchronization. The portions A to E relate to what is commonly referred to as flags, whose functions are as follows:

flag A: a signal transmitted by the interface II to indicate that the devices connected to this interface are in the command mode and that these devices have reported that they are ready for receiving a command byte from the central processor.

flag B: a signal transmitted by the interface II to indicate that all the devices connected to this interface have received the command byte from the central processor.

flag C: the interface transmitting the flag C=true is connected to the speaker via the bus. The interface receiving the flag C=true is to change from the accept state to the source state since this interface is not directly connected to the speaker via the bus but via the path 29. In this situation the source state is that state to which the interface can be adjusted in which data bytes are stored in the elastic store via the connecting path 29 and are read again by using the local handshake procedure.

flag D: this flag is used to report to an interface at the other end of the path 29 that the data transport must be stopped since the elastic store threatens to become full.

flag E: by means of this flag an interface indicates that a data byte or a command byte is transmitted, and signalizes to the receiving interface whether the frame contains relevant information or not. When the E=true, the information is relevant and when the flag E=not true, the information is not relevant.

The above described flags A to E are conveyed to the shift register 7 via the line 60 under the control of control signals originating from the bus and which are applied to the input of the checking input S via the buffer 5. The buffer stage 5 has the same function for control signals as the buffer stage 4 has for data signals.

The next following 5 bit positions of the frame shown in FIG. 2a relate to the above-mentioned uniline messages relative to the general interface management. Their functions are:

SR: Service Request. When this signal is true, this means that a device has something to report to the central processor 3.

IC: Interface Clear. When this signal is true, this means that the relevant interface is ready for receiving data bytes.

RE: Remote Enable. When this signal is true, this means that a change can be made from local control to remote control.

AT: Attention. When this signal is true, the central processor signals to the other devices that it wants to perform its function.

EI: End or Identify. When this signal is true, it may have two meanings. When EI=true in combination with AT=true, this means that the central processor signals to all the devices connected to it that it intends to transmit an invitation for transmitting data bytes. When EI=true in combination with AT=not true, this means that the speaker transmits its last data byte.

The subsequent 8 bits positions D1 to D8 of the frame are used for the data bytes. Always 1 byte=8 bits is entered per frame into the shift register 7.

Figure 2B:
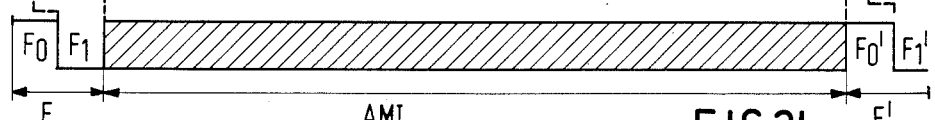
Figure 3A:
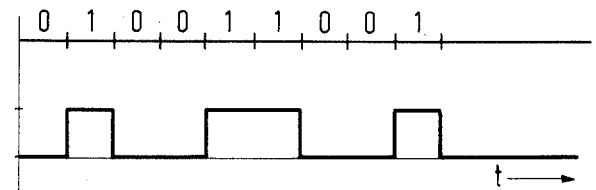
FIG. 3a and 3b show time sequence diagrams for converting a binary signal into a signal having the AMI code format.
Figure 3B:

The serial digital data stream coming from the output of the shift register 7 is converted with the aid of the encoding unit into a signal of the AMI-code format (alternating mark inversion). The time sequence diagrams in FIG. 3 illustrate an example of the conversion of a binary signal with logic 1 bits and logic 0 bits (diagram a) into an AMI-encoded signal (diagram b). The AMI-code is a 2-level code in which a logic 0-bit is endoced such that each of the two levels E1 and E2 is present during half a bit time interval, first E1 then E2. A logic 1 bit is encoded by one of the two levels during an entire bit time interval more specifically such that the level alternates for consecutive logic 1 bits. As is illustrated in FIG. 2 by means of hatched lines, the twenty bit positions located between F and F' are AMI-encoded. The portions F and F' are not encoded and are of a structure as shown in the Figure. The portions FO and FO' determine the ends of a frame and each comprise two bit positions. The portions F1 and F1' which also comprise two bit positions each, determine the beginning of a frame. Since the portions F and F' are not encoded, these portions can be detected in the decoding arrangements 9 and 17 with the aid of an error monitoring circuit included in these arrangements. Such a monitoring circuit utilizes the redundance of the AMI line code. The line code rule is then monitored for violations, such that each time a violation occurs the conclusion can be drawn therefrom in the event of a good input signal, that a frame starts or ends depending on the fact whether there is a 0/1 transition or a 1/0 transition. This manner of frame synchronization is much simpler than using frame words in combination with lengthy frame synchronizing techniques. A further advantage of the use of the AMI-code is that as a result thereof the clock regeneration in the decoding arrangements 9 and 17 can be realized in a much simpler way. In the parallel-series converters 7 and 22 the parallel data are read serially at a clock frequency of at least 24 MHz. The clock signals are applied to the respective clock inputs 70 and 27. In the encoding arrangements 8 and 25 these serial signals are converted at a rate of 48 MHz into corresponding AMI-signals with the aid of clock signals present at the respective clock inputs 80 and 26. In the decoding arrangements 17 and 9 a 48 MHz block signal is regenerated with the aid of which the AMI-signal is reconverted into the original signal. At the same time a 24 MHz clock signal which, via the lines 28 and 90, is applied to the respective series-parallel converters 18 and 10 is derived from said 48 MHz clock signal. Using these 24 MHz clock signals the signals originating from the decoding arrangements 17 and 9 are serially entered into the associated series-parallel converters 18 and 10.

The bus system is in the command mode when the central processor 3 has rendered the general interface management line AT=true. In this state a speaker cannot exchange data with a listener, since in this state the only thing possible for both a speaker and a listener is receiving command bytes. When the system is in the command mode the handshake procedure will preferably not be effected locally but via the connecting path 29 between the two interfaces I and II. In addition, the command bytes will not be conveyed to a bus half via one of the elastic stores 20 or 11 but directly. For that purpose the two switches 19 and 12 are provided. In the command mode the outputs of the series-parallel converters 18 and 10 are directly through-connected to the inputs of the respective buffer stages 24 and 4 via the respective switches 19 and 12. When the system is in the data mode, the two switches 19 and 12 are in the other position. The position of the switches 19 and 12 are controlled with the aid of the respective checking circuits 21 and 6, see dotted line.

The reason why the elastic stores 20 and 11 are not used in the command mode of the system, resides in the fact that in that case we can be sure that the two elastic stores are completely empty when the system is switched back from the command mode to the data mode. Since the command bytes cannot be stored in the elastic stores, this means that the complete system has accepted the commands, after the command mode is left. The conveyance of data can consequently start immediately. It should of course be noted that the throughput rate of the command bytes is much lower (15 kbit/s) than the throughput rate of the data bytes (1 Mbit/s) since the conveyance of the command bytes is effected with the aid of a handshake procedure via the connecting path 29. On the other hand the number of command bytes is much less than the number of data bytes. Thus, there is described an embodiment of the invention which is described more particularly by the claims which follow.

What is claimed is:

1. A bus system comprising:
   first and second bus halves, each half comprising a plurality of parallel lines for transmitting handshake signals, data signals and command signals;
   a central processor connected to one of said bus halves for transmitting commands over said first bus half;
   a plurality of communicating devices connected to said first and second bus halves for transmitting and receiving data signals and check signals;
   a first interface including a parallel series converter having an input connected to said first bus half and an output;
   a second interface having a series parallel converter having an input, and an output connected to an input of an elastic buffer storage means, said elastic storage means having a parallel output connected to said second bus half; and
   a connection path extending between said first interface parallel/series converter output and said second interface series/parallel converter input, whereby a device connected to one bus half communicates handshake signals with an interface connected to said one bus half, and data received by said second interface is stored in said elastic store and then retransmitted over said second bus half.

2. A bus system as claimed in claim 1, wherein the output of the first interface parallel-series converter is connected to the connection path through an AMI-encoding arrrangement and that the input of the second interface series-parallel converter is connected to the connection path through an AMI-decoding arrangement.

3. A bus system as claimed in claim 1, characterized in that the output of the series-parallel converter is connected to switching means through which, when the system is in the data mode, said output is connected to the input of the elastic store and through which, the system being in the command mode, said output is connected to the output of the elastic store.

4. A bus system as claimed in claim 2, characterized in that the output of the series-parallel converter is connected to switching means through which, when the system is in the data mode, said output is connected to the input of the elastic store and through which, the system being in the command mode, said output is connected to the output of the elastic store.

* * * * *